INVENTORS
CLAUDE CHEMLA
CLAUDE CRAMER
FRANCOIS LEGER
BY
AGENT

POLYPHASE PRIORITY DETERMINING SYSTEM

Filed May 19, 1966 3 Sheets-Sheet 2

INVENTORS
CLAUDE CHEMLA
CLAUDE CRAMER
FRANCOIS LEGER
BY Frank R. Trifari
AGENT

POLYPHASE PRIORITY DETERMINING SYSTEM

Filed May 19, 1966 3 Sheets-Sheet 3

| | E | F | G |
|---|---|---|---|
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

INVENTORS
CLAUDE CHEMLA
CLAUDE CRAMER
FRANCOIS LEGER
BY
AGENT 3,462,738

POLYPHASE PRIORITY DETERMINING SYSTEM

Claude Chemla, Saint-Cloud, Claude Cramer, Champigny-sur-Marne, and Francois Leger, Vincennes, France, assignors, by mesne assignments, to U.S. Philips Corporation, New York, N.Y., a corporation of Delaware Filed May 19, 1966, Ser. No. 551,268
Claims priority, application France, June 18, 1965, 21,409
Int. Cl. H04q 3/42
U.S. Cl. 340—147 2 Claims

ABSTRACT OF THE DISCLOSURE

A system for sequentially determining the priority between groups of program request signals and the priority of individual program request signals within a group. The system uses dual output switches for first passing all the request signals into a first priority determining logic network, the output of which determines the highest priority group to be fed to a second priority network.

This invention relates to arrangements controlled by a clock-pulse cycle having at least two phases, for giving priority to one of a number of request signals received through a plurality of request lines which are divided into at least two groups arranged in accordance with a given order of priority, the request lines of a given group being arranged within this group likewise in accordance with a given order of priority.

The need for such an arrangement arises, for example, if a general purpose electronic computer is to be used for handling signals received through an often large number of lines (128 or more). The computer can then handle only one of these signals. It may also occur that the handling of a given incoming signal must be temporarily interrupted in behalf of the handling of another incoming signal because the result of the handling of the last-mentioned signal is required more urgently than that of the handling of the first-mentioned signal. If two or more requests for signal handling are present at a given instant it is for the same reason necessary to determine which signal must be handled first or, which request must be handled with priority over the other ones. The situation described occurs more particularly if the computer is used as a telegraph exchange, as a process controlling system for some industrial process, as a centrally-organized bookkeeping system, etc.

The arrangement according to the invention is characterized in that each incoming request line is connected to a normally closed gate, each gate having a first and a second output; that the arrangement comprises a first logical circuit which is connected through an or-circuit to all the first outputs of the gates relating to the first group, through another or-circuit to all the first outputs of the gates relating to the second group and so forth, said first logical circuit being coupled to a first memory which in turn is connected to a signal transformer; that the arrangement comprises a second logical circuit which is connected through an or-circuit to the second outputs of all the gates relating to the first priority programs of all the groups, through another or-circuit (02) to the second outputs of all the gates relating to the second priority programs of all the groups and so forth. The second logical circuit is connected to a second memory. Each of the two logical circuits is designed so that it assigns priority to one of the request signals it receives, in accordance with a principle determined by the construction of the relevant logical circuit. This construction may differ for the two logical circuits, when it receives a clock pulse. The arrangement as a whole is designed so that, during a first phase of a clock pulse cycle, the first logical circuit and all the gates receive a clock pulse causing the gates to pass the incoming request signals to their first outputs and causing the first logical circuit to pass a signal which is identified with the group having priority to the first memory and to the signal transformer and that during the second phase of the clock pulse cycle, the second logical circuit and the signal transformer receive a clock pulse causing the signal transformer to pass a signal to all the gates of the group having priority thus passing the incoming request signals to their second outputs and causing the second logical circuit to apply a signal which is identified with the request signal having priority of the group having priority to the second memory.

The priority of one signal handling over another may be of two kinds which will be distinguished as a strong and a weak priority in analogy with the distinction in strong and weak extreme values in the calculus of variation.

A program $x$ has a strong priority over a program $y$ if the program $y$ is interrupted and replaced by the program $x$ upon receipt of a request for the program $x$ while the program $y$ is in course of execution.

A program $x$ has a weak priority over a program $y$ if in case of simultaneous presence of requests for the programs $x$ and $y$, the program $x$ is initiated but the program $y$ can never be interrupted by the program $x$ upon receipt of a request for the program $x$ while the program $y$ is in course of execution.

The invention is independent of this detail since it depends upon the control of the further equipment, i.e. the computer, whether a program which is in course of execution is interrupted in behalf of another or not. however, it may be practical to give all the requests from a given group strong priority over requests from all the groups having a lower priority whereas the order of priority of the requests within the same groups is always a weak one.

The invention is further independent of the principle according to which the order of priority is fixed, especially in the same group. Principles which primarily enter into account are the following:

(1) The input lines relating to the relevant group are numbered 1, 2, 3 . . . , $n$. A request received through the line 1 has priority over requests received through the remaining lines, a request received through the line 2 has priority over requests received through the lines 3, 4 . . . , $n$, a request received through the line 3 has priority over requests received through the lines 4 . . . , $n$, and so forth.

(2) The input lines relating to the relevant group are numbered, as in the previous case 1, 2, 3 . . . , $n$. In the case of simultaneous presence of two or more requests that request has priority which follows in cyclic sequence after the request which has last been completely handled.

(3) In the case of simultaneous presence of two or more requests that request has priority which first arrived.

Circuits for determining the priority on each of the above-mentioned principles are already known and need not therefore be described herein.

In order that the invention may be readily carried into effect, it will now be described in detail, by way of example, with reference to the accompanying diagrammatic drawings, in which.

Figure 1:
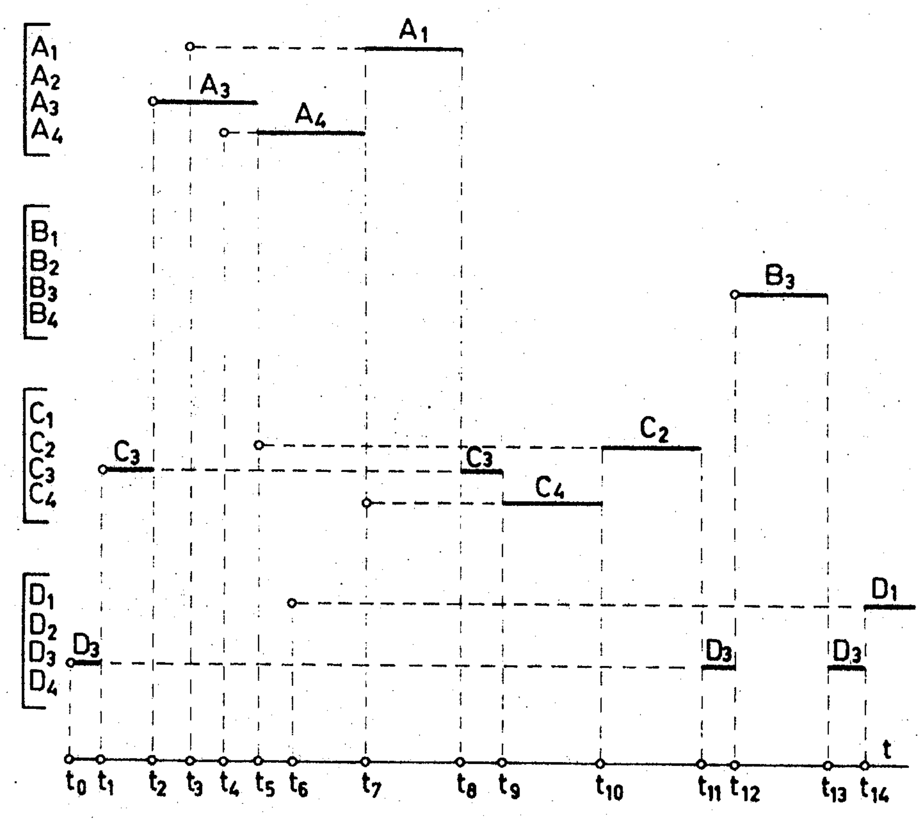
FIGURE 1 shows a diagram which serves to explain the principle of the determination of priority.

The diagram of FIGURE 1 serves to give an insight in the kind of the functions which the priority circuit as a whole must be able to fulfill. In this figure there are assumed to be four groups of programs. The programs of group A have priority over those of the groups B, C, and D, those of group B over those of the groups C and D, and those of group C over those of group D. As previously mentioned, the arrangement according to the invention is independent of whether this order of priority is a strong one or a weak one. In the FIGURE 1 is a strong order priority is concerned.

Each group comprises four programs to which an order of priority is likewise assigned in accordance with some principle or other (which is not essential to the invention and need not necessarily be the same as the principle used for the groups). In FIGURE 1 this is assumed to be a weak order of priority in accordance with the cyclic principle described above sub 2.

Let it be assumed that initially no program is in course of execution and that at the instants $t_0$, $t_1$, $t_2$, $t_3$, $t_4$, $t_5$, $t_6$, $t_7$, and $t_{12}$ requests arrive for the programs $D_3$, $C_3$, $A_3$, $A_1$, $A_4$, $C_2$, $D_1$, $C_4$ and $B_3$. In this case the program $D_3$ is started at the instant $t_0$. However, this program is interrupted as the instant $t_1$ since a request for the program $C_3$ is then received and programs of the group C all have strong priority over programs of the group D. Thus the program $D_3$ is interrupted as the instant $t_1$ and the program $C_3$ is started. However, this program in turn is interrupted at the instant $t_2$ since a request for the program $A_3$ is then received and programs of the group A all have strong priority over programs of the group C. Thus the program $C_3$ is stopped at the instant $t_2$ and the program $A_3$ is started, which program, as belonging to the group A having the highest priority, cannot be interrupted. Before the program $A_3$ has been completed at the instant $t_5$ requests for the programs $A_1$ (at $t_3$) and $A_4$ (at $t_4$) have been received so that, when the program $A_3$ is completed at the instant $t_5$, the program $A_4$ is initiated (since it cyclically follows after the program $A_3$ in group A). When the program $A_4$ has ended at the instant $t_7$ the program $A_1$ is started (since it cyclically follows after the program $A_4$ in group A).

Before the program $A_1$ is completed, however, a request for the program $C_2$ has been received at the instant $t_5$, a request for the program $D_1$ at the instant $t_6$ and a request for the program $C_4$ at the instant $t_7$.

Thus at the instant $t_8$ when the program $A_1$ has ended, the following programs enter into account for execution:

(1) the programs $C_3$ and $D_3$ which are still unfinished;

(2) the programs $C_2$, $C_4$ and $D_1$ which have not yet begun.

However, of these programs those of group C first enter into account since all the programs of this group have priority over those of group D. Since the cyclical priority principle prevails in group C the interrupted programs $C_3$ is first continued. When this program is terminated at the instant $t_9$ the program $C_4$ is started (since it cyclically follows after the program $C_3$ in group C). As soon as the program $C_4$ has ended (at the instant $t_{10}$) the program $C_2$ enters into account.

At the instant $t_{11}$ when the handling $C_2$ has ended, the following programs enter into account for execution:

(1) the program $D_3$ which is still unfinished;

(2) the program $D_1$ which has not yet started.

The result is that the program $D_3$ must be continued again at the instant $t_{11}$. However, this program is again interrupted at the instant $t_{12}$ since a request for the program $B_3$ is then received. It is only after the program $B_3$ has been completed at the instant $t_{13}$ that the program $D_3$ is restarted. When the program $D_3$ is completed at the instant $t_{14}$ it is the turn of the handling $D_1$ to be started.

Figure 2:
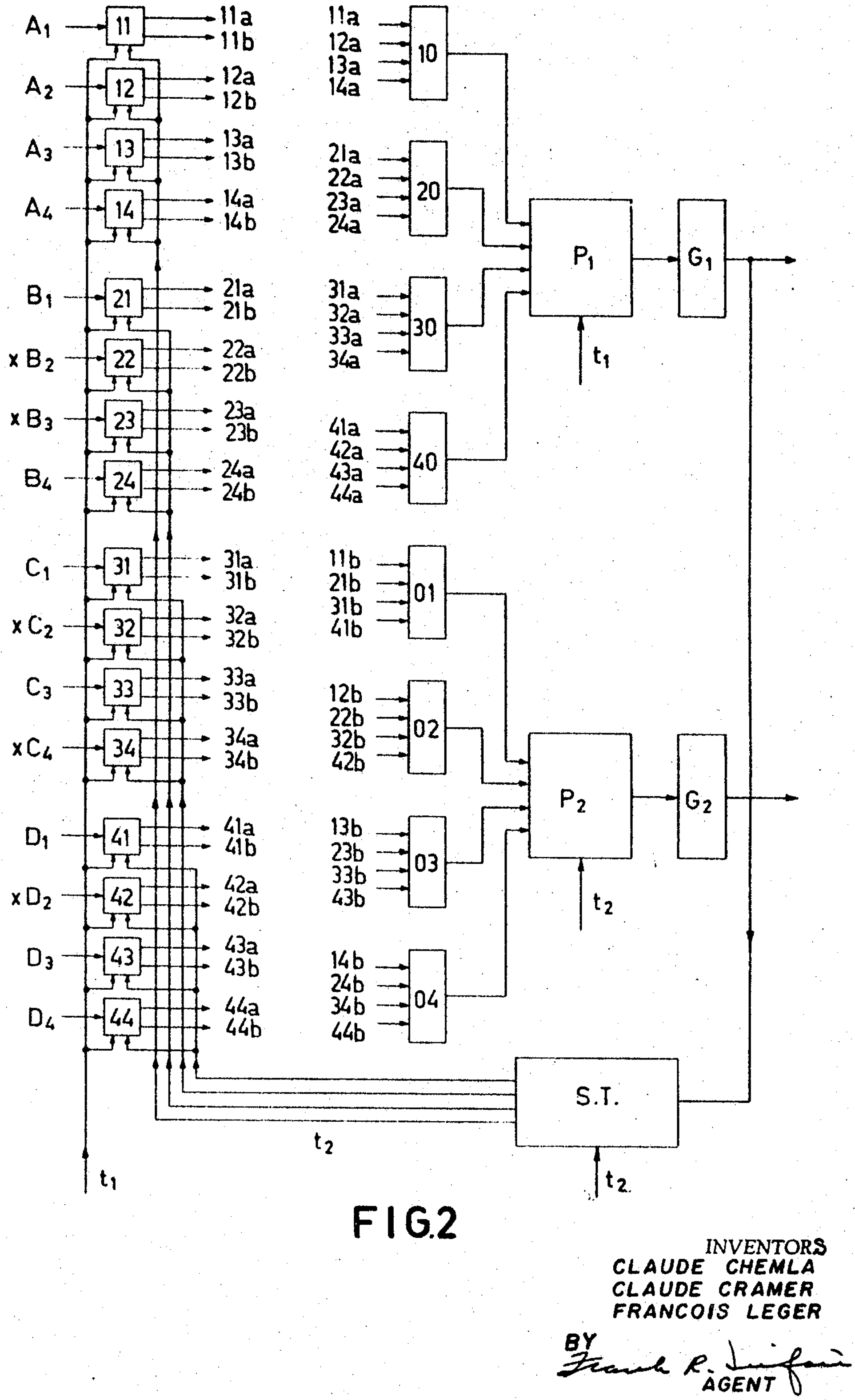
FIGURE 2 is a block diagram of an arrangement according to the invention.

FIGURE 2 shows the block diagram of a priority circuit according to the invention with which the described principle of priority determination can be carried out. The lines through which a request signal may be received are indicated by $A_1$, $A_2$ . . ., $D_4$. Each request line is connected to a normally closed gate having two outputs. In the figure these are the gates, 11, 12 . . ., 44. The gate 11 has the two outputs **11*a* and 11*b*, the gate 12 has the outputs 12*a* and 12*b*, etc. The outputs 11*a*, 12*a*, 13*a*, 14*a*, i.e. the first outputs of the gates relating to the group A, are connected to an or-circuit 10. Similarly the first outputs 21*a*, 22*a*, 23*a*, 24*a* of the gates relating to group B are connected to an or-circuit 20, and so forth. The outputs 11*b*, 21*b*, 31*b*, 41*b*, i.e. the second outputs of the gates relating to the first request line of each group, are connected to an or-circuit 10. Similarly the second outputs 12*b*, 22*b*, 32*b*, 42*b* of the gates relating to the second request line of each group are connected to an or-circuit 20, and so forth. The outputs of the or-circuits 10, 20, 30 and 40 are connected to a first logical circuit $P_1$. The signal provided by this logical circuit is applied to a first memory $G_1$ and stored therein. The signal stored in the memory $G_1$ can be transferred to a signal transformer S.T. The outputs of the or-circuits 01, 02, 03, 04** are applied to a second logical circuit $P_2$ and the signal provided by this second logical element is stored in a second memory $G_2$.

Finally it is assumed that the arrangement is controlled by a clock pulse cycle with two phases which are referred to as $t_1$ and $t_2$. The member supplying the clock pulses is not shown for the sake of simplicity.

The arrangemnet operates as follows:

Let it be assumed that, at a given instant, requests for the programs $B_2$, $B_3$, $C_2$, $C_4$ and $D_2$ are present. This means that each of the lines marked by crosses in FIGURE 2 includes a signal of the signal value 1 (for example a high voltage). During the next phase $t_1$ of the clock pulse cycles all the gates 11, 12 . . ., 44 and also the logical circuit $P_1$ receive a clock pulse. Consequently the gates 11, 12 . . ., 44 pass the incoming signal values through their first outputs **11*a*, 12*a* . . ., 44*a* to the or-circuits 10, 20, 30 and 40. Each of the or-circuits 20, 30 and 40** thus receives at least one signal with the signal value 1 and the logical circuit $P_1$ can determine that the group B is the group of the highest priority in which a request occurs. This information is transferred to the memory $G_1$ and, through this memory, also to the signal transformer S.T.

During the subsequent phase $t_2$ of the clock pulse cycle the signal transformer S.T. and the logical circuit $P_2$ receive a clock pulse. Consequently the signal transformer applies a pulse to all the gates 21, 22, 23, 24 relating to group B, which results in the said gates passing the incoming signals through their second outputs **21*b*, 22*b*, 23*b*, 24*b* to the or-circuits 01, 02, 03, 04. Thus the or-circuits 02 and 03** each receive a signal with the signal value 1 and thus provide an output signal with the signal value 1. The logical circuit $P_2$ can thus determine that the second request signal from some group or other (group B in this example) now has priority. When the relevant program $B_2$ is terminated the signal on the line $B_2$ reassumes the value 0.

The various component parts of which the arrangement may be built up can be of known construction. This applies especially to the gates 11, 12 . . ., 44, to the or-circuits 10 . . ., 40, 01 . . ., 04, the memories $G_1$ and $G_2$ and the signal transformer S.T., which latter has to convert only the code groups of an arbitrary code comprising bivalent code elements into the code groups of a 1-out-*n*-code.

Although numerous solutions are already known also for the logical circuit $P_1$ and $P_2$ one possible embodiment will be described especially for the element $P_1$. To avoid undue simplification of the example which would make the underlying idea insufficiently clear, it is assumed that the element must give priority to one of at most seven request signals.

Figures 3, 4:
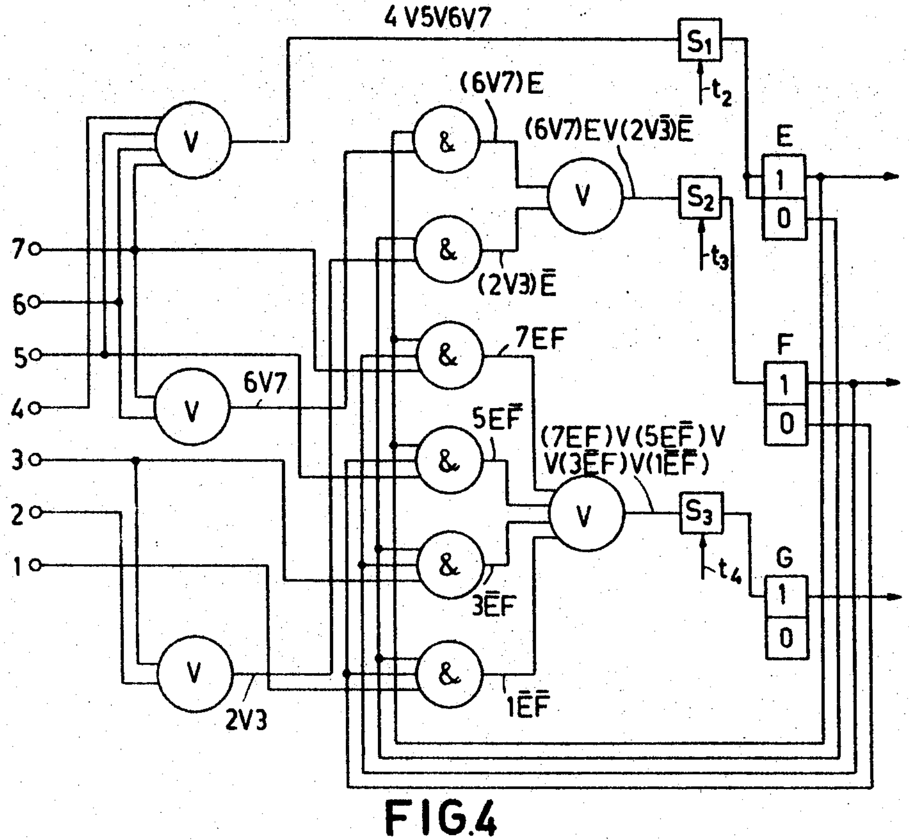
FIGURE 3 is a table for explaining the working of a logical circuit for determining priority.
FIGURE 4 is a possible embodiment of a logical circuit for determining priority.

The request signals are numbered, 1, 2 . . ., 7, written in the binary number system: 001, 010 . . ., 111 (see FIGURE 3). If, now, one or more of the request signals has the value 1 the circuit must indicate the highest of the relevant numbers and store it in a memory. In FIGURE 4 this store comprises three flip-flops E, F and G. From the table of FIGURE 3 it may readily be seen that the flip-flop E must have the position 1 if one or more of the request signals 4, 5, 6, 7 has the signal value 1. This means that the 1-input of the flip-flop E must receive the signals $e$=4V5V6V and for this purpose a fourfold or-circuit (FIGURE 4) is used.

Futher it may be seen from FIGURE 3 that the flip-flop F must occupy the position 1 when the flip-flop E is in the position 1 and at least one of the request signals 6 and 7 has the value 1 (case (6V7) E), but also if the flip-flop E occupies the position 0 and at least one of the request signals 2 and 3 has the value 1 (case (2V3) $\overline{E}$). From this it follows that the 1-input of the flip-flop F must receive the signal {(6V7)$\overline{E}$}V{(2V3)$\overline{E}$}.

Finally it follows from FIGURE 3 that the flip-flop G must occupy the position 1 in one of the following cases:

(1) Request signal 7 has the value 1, E is in position 1, F is in position 1 (case 7EF);

(2) Request signal 5 has the value 1, E is in position 1, F is in position 0 (case 5E$\overline{F}$);

(3) Request signal 3 has the value 1, E is in position 0, F is in position 1 (case 3$\overline{E}$F);

(4) Request signal 1 has the value 1, E is in position 0, F is in position 0 (case 1$\overline{E}\,\overline{F}$).

From this it follows that the 1-input of the flip-flop G must receive the signal (7EF) V (5E$\overline{F}$) V (3$\overline{E}$F V (1$\overline{E}\,\overline{F}$).

It is known from, for example, the article by Robert Serrel—Elements of Boolean Algebra for the Study of Information Handling Systems (PIRE, Oct. 1953, pp. 1366–1380) how a circuit can be constructed which realises a given Boolean-algebraic function. FIGURE 4 shows the diagram of a circuit for the Boolean-algebraic functions thus derived, which circuit may be regarded as a direct technical translation of these functions.

The flip-flop E is adjusted during the phase $t_2$ of the clock pulses. The flip-flop F can be adjusted only when the flip-flop E has been adjusted before and is therefore adjusted to the phase $t_3$ of the clock pulse cycle. The flip-flop G can be adjusted only when the flip-flops E and F have been adjusted before and is therefore adjusted to the phase $t_4$ of the clock pulse cycle. In the arrangement of FIGURE 4 this is achieved by leading the signals which have to adjust the flip-flops E, F and G through gates ($S_1$, $S_2$, $S_3$ in FIGURE 4) which normally are closed but are opened during the respective phases $t_2$, $t_3$ and $t_4$.

What is claimed is:

1. A system for determining the priority between groups of request signals received on groups of request lines and for determining the priority between individual request signals of a group, comprising a first priority determining circuit, switch means responsive to a first clock pulse for connecting all the request signal lines to said first priority determining circuit, said first priority determining circuit comprising means for providing a code corresponding to the highest priority group of request lines containing a request signal, a second priority determining circuit, said switch means further comprising means connected to said first priority determining circuit and responsive to a second clock pulse which sequentially follows said first clock pulse for connecting the request signal lines of the group of request signals indicated by said code to said second priority determining circuit.

2. A system for sequentially determining first the priority between groups of program request signals and then the priority of individual signals within the highest priority group of signals, comprising means for receiving at least two sequential clock signals, a separate switching means for each request signal, each of said switching means having an input terminal, a first output terminal, a second output terminal, a first signal responsive control terminal for connecting said input terminal of said switching means to said first output terminal of said switching means and a second signal responsive control terminal for connecting said input terminal of said switching means to said second output terminal of said switching means, a first set of or-gates corresponding to each group of request signals, means for connecting the first output terminal of each switching means corresponding to a group of request signals to the or-gate corresponding to that group of request signals, means for connecting a first one of said sequential clock signals to the first control terminal of each of said switching means, means for connecting each request signal to said corresponding input terminal of said switching means, whereby said first clock signal causes each of said request signals to be connected to the or-gate of said first set of or-gates corresponding to the group of said request signal, each or-gate of said first set of or-gates providing an output in response to the presence of any of said connected request signals of a corresponding group, a first priority determining logic circuit connected to the output of each of said first set of or-gates for providing a code corresponding to the highest priority or-gate of the first set of or-gates which is providing an output, signal transformer means connected to said first priority determining logic circuit and having an output terminal corresponding to each group of request signals for converting said code into a single output signal on the output terminal of said signal transformer corresponding to the highest priority group which is providing a request signal, means for connecting each output terminal of said signal transformer to the second control terminals of each of the switching means corresponding to the group represented by said signal transformer output terminal, a second series of or-gates corresponding to the maximum number of request signals in a group, means for connecting the second output terminals of all the switching means corresponding to the highest priority request signal of each group to one of said second series of or-gates, means for connecting the second output terminals of all the switching means corresponding to request signals of similar intra-group priority to separate ones of said or-gates in said second series of or-gates, whereby said second clock signal causes said request signals to be connected to said second series of or-gates, and a second priority determining logic circuit connected to each of said second series of or-gates for providing a code corresponding to the highest priority request signal of the group selected by said first priority circuit.

References Cited

UNITED STATES PATENTS

| | | | |
|---|---|---|---|
| 2,935,627 | 5/1960 | Schneider | 340—147 XR |
| 3,199,081 | 8/1965 | Kok et al. | 340—147 |
| 3,268,866 | 8/1966 | Van't Slot et al. | 340—147 |

DONALD J. YUSKO, Primary Examiner

U.S. Cl. X.R.

307—241